United States Patent
Muramatsu et al.

(10) Patent No.: US 10,704,475 B2
(45) Date of Patent: Jul. 7, 2020

(54) ENGINE CONTROL DEVICE (71) Applicant: SUBARU CORPORATION, Tokyo (JP)

(72) Inventors: Konosuke Muramatsu, Tokyo (JP); Tomoyuki Kaneda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 150 days.

(21) Appl. No.: 16/001,800

(22) Filed: Jun. 6, 2018

(65) Prior Publication Data
US 2019/0093574 A1 Mar. 28, 2019

(30) Foreign Application Priority Data
Sep. 28, 2017 (JP) .................. 2017-187712

(51) Int. Cl.
F02D 41/00 (2006.01)
F02B 37/18 (2006.01)
(Continued)

(52) U.S. Cl.
CPC .......... F02D 41/0007 (2013.01); F02B 37/18 (2013.01); F02D 9/02 (2013.01);
(Continued)

(58) Field of Classification Search
CPC ........ F02B 37/18; F02B 37/225; F02B 39/16; F02D 23/00; F02D 41/0007
See application file for complete search history.

(56) References Cited

U.S. PATENT DOCUMENTS 5,307,783 A * 5/1994 Satoya .................. F02B 33/446
123/559.3
2015/0120115 A1 4/2015 Chinbe et al.
(Continued)

FOREIGN PATENT DOCUMENTS

JP H 05-079342 A 3/1993
JP 2006-291965 A 10/2006
(Continued)

OTHER PUBLICATIONS

Japanese Office Action, dated Jan. 22, 2019, in Japanese Application No. 2017-187712 and Enolish Translation thereof.

Primary Examiner — Brandon D Lee
(74) Attorney, Agent, or Firm — McGinn I. P. Law Group, PLLC (57) ABSTRACT An engine control device controls an engine. The engine includes a turbocharger, a waste gate valve, and a throttle. In a predetermined low load region, the engine control device performs first control in which the waste gate valve is opened at a predetermined opening degree or more and output adjustment is performed by an opening degree of the throttle. In a predetermined high load region, the engine control device performs second control in which the throttle is opened at a predetermined opening degree or more and output adjustment is performed by an opening degree of the waste gate valve. When a torque limiting request is generated in the high load region, the engine control device performs third control in which the waste gate valve is substantially fully closed and output adjustment is performed by the opening degree of the throttle.

20 Claims, 3 Drawing Sheets (51) Int. Cl.
*F02D 9/02* (2006.01)
*F02D 41/02* (2006.01)
(52) U.S. Cl.
CPC .. *F02D 41/0215* (2013.01); *F02D 2200/1002* (2013.01); *F02D 2200/50* (2013.01); *F02D 2250/26* (2013.01)

(56) References Cited

U.S. PATENT DOCUMENTS

| | | |
|---|---|---|
| 2016/0084178 A1 | 3/2016 | Shimizu et al. |
| 2016/0102603 A1* | 4/2016 | Matsumoto ............ F02B 37/186 60/600 |

FOREIGN PATENT DOCUMENTS

| | | |
|---|---|---|
| JP | 2013-238195 A | 11/2013 |
| JP | 2014-231834 A | 12/2014 |
| JP | 2015-129469 A | 7/2015 |
| JP | 2016-079808 A | 5/2016 |

* cited by examiner

ENGINE CONTROL DEVICE

CROSS-REFERENCE TO RELATED APPLICATIONS

The present application claims priority from Japanese Patent Application No. 2017-187712 filed on Sep. 28, 2017, the entire contents of which are hereby incorporated by reference.

BACKGROUND

1. Technical Field

The present invention relates to an engine control device that performs output adjustment of a turbocharged engine.

2. Related Art

In an engine that performs turbocharging, the supercharging pressure is controlled by controlling the flow rate of exhaust gas to a turbine using a waste gate valve through which exhaust gas bypasses the section from the inlet side to the outlet side of a turbine.

In recent years, an electronically controlled waste gate valve is being widely used in which a waste gate valve is opened and closed by an electric actuator so that the opening degree thereof can be electrically controlled to approach any target opening degree.

As a related art concerning the opening degree control of a waste gate valve as described above, for instance, Japanese Unexamined Patent Application Publication (JP-A) No. 5-79342 describes a control device for an engine with a supercharger having an opening degree control prohibition member that prohibits the opening degree control of a waste gate valve on the basis of a state in which at least one of the opening degree of a main throttle valve operating in conjunction with an accelerator pedal during supercharging and the opening degree of a sub-throttle valve opened and closed on the basis of external environment information is less than a predetermined value.

JP-A No. 2014-231834 describes a control device for an engine with a supercharger that limits the climb inclination of the output torque of an engine using torque limiting processing by reducing the opening degree of a throttle valve of the engine by a predetermined amount and then gradually increasing the opening degree of the throttle vale without changing the opening degree of a waste gate valve from a value in a normal time.

JP-A No. 2015-129469 describes a control device for an engine with a supercharger that adjusts the opening degree of a waste gate valve to a reduced value to increase a supercharging pressure when the requested value of the supercharging pressure increases, increases the opening degree of a throttle valve, and limits the climb inclination of the output torque on condition that the driver requested driving force is alienated to the increase side with respect to the actual driving force of the engine and the change amount of requested power is equal to or less than a predetermined value.

SUMMARY OF THE INVENTION

An aspect of the present invention provides an engine control device configured to control an engine. The engine includes a turbocharger including a turbine to be driven by exhaust gas and a compressor configured to be driven by the turbine, a waste gate valve that is provided in a passage that allows the exhaust gas to bypass a section from an inlet side to an outlet side of the turbine, and a throttle configured to adjust an intake air amount. In a predetermined low load region, the engine control device is configured to perform first control in which the waste gate valve is opened at a predetermined opening degree or more and output adjustment is performed by an opening degree of the throttle in a predetermined low load region. In a predetermined high load region, the engine control device is configured to perform second control in which the throttle is opened at a predetermined opening degree or more and output adjustment is performed by an opening degree of the waste gate valve. When a torque limiting request is generated in the high load region, the engine control device is configured to perform third control in which the waste gate valve is substantially fully closed and output adjustment is performed by the opening degree of the throttle.

DETAILED DESCRIPTION

An engine control device according to an example of the present invention will be described below. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In a turbocharged engine having an electronically controlled waste gate valve, a change of control depending on the load region is proposed in which a waste gate valve is fully opened and output adjustment is performed by the opening degree of a throttle in an NA region (non-supercharging region) in which the load is relatively small and supercharging is not necessary, and a throttle is fully opened and output adjustment is performed by the opening degree (supercharging pressure) of a waste gate valve in a supercharging area in which the load is relatively large and supercharging is necessary.

In a vehicle having such a turbocharged engine, limitation may be imposed on the output torque of an engine in terms of the durability of the drive system or the like.

For instance, in a vehicle having a torque converter between an engine and a transmission mechanism of a transmission, when a lock-up clutch of the torque converter is in an open state (unengaged state), output adjustment may be performed so that the output torque of the engine becomes equal to or less than a predetermined limited torque to protect the transmission from an excess input torque.

Since the waste gate valve is opened when torque limitation is imposed and the normal control described above is made, exhaust gas bypasses the turbine and the rotation speeds of the compressor and the turbine of a turbocharger are reduced and a supercharging response delay after releasing the torque limitation is increased, thereby reducing the acceleration performance of the vehicle.

It is desirable to provide to an engine control device that suppresses a supercharging response delay when acceleration is made from the state in which torque limitation is imposed.

The engine control device according to the example is provided in a turbocharged gasoline engine that is mounted as a traveling power source in an automobile such as a passenger car.

Figure 1:
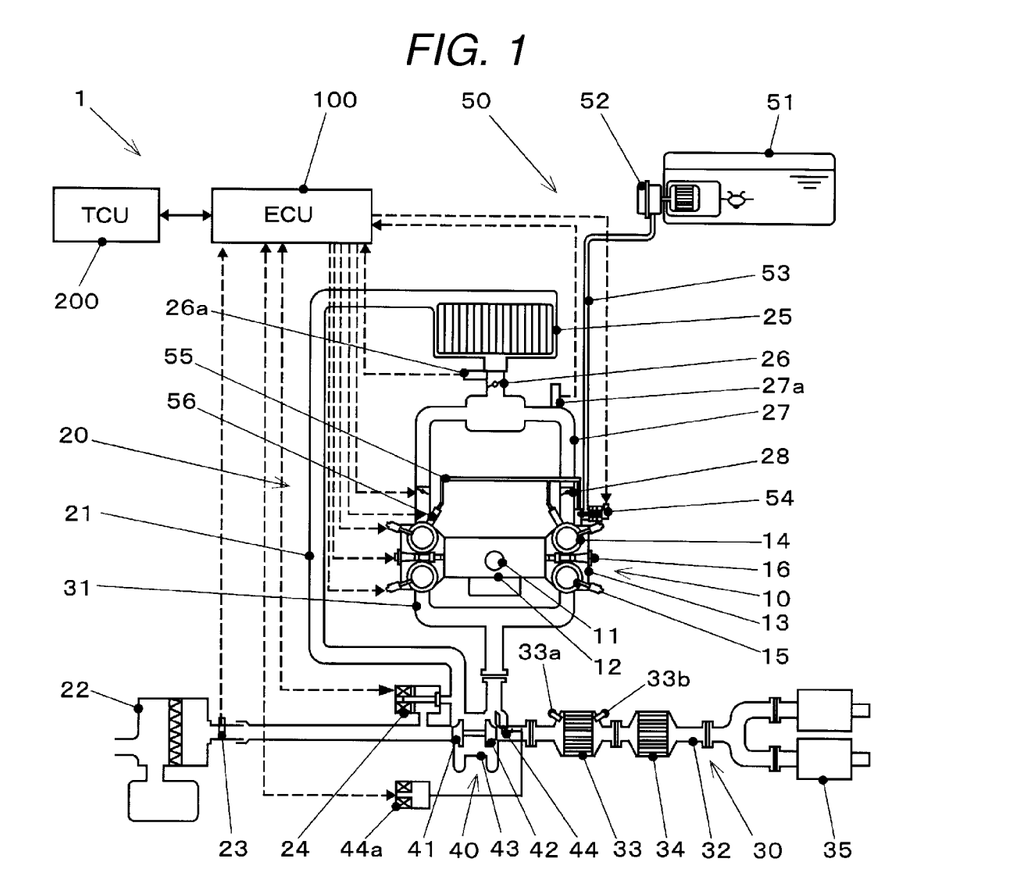
FIG. 1 schematically illustrates the structure of an engine having an engine control device according to an example of the present invention.

FIG. 1 schematically illustrates the structure of the engine having the engine control device according to the example.

As illustrated in FIG. 1, an engine 1 has a main body 10, an intake system 20, an exhaust system 30, a turbocharger 40, a fuel supply device 50, an engine control unit (ECU) 100, and the like.

The main body 10 is a main engine part of the engine 1 and is, for instance, a horizontally-opposed four-cylinder four-stroke DOHC gasoline direct injection engine.

The main body 10 includes a crankshaft 11, a cylinder block 12, a cylinder head 13, an intake valve drive system 14, an exhaust valve drive system 15, an ignition plug 16, and the like.

The crankshaft 11 is an output shaft of the engine 1 and pistons (not illustrated) of individual cylinders are coupled to the crankshaft 11 via connecting rods (conrods).

The cylinder block 12 is a block-shaped member that has the cylinders, and is divided into two right and left parts with the crankshaft 11 interposed therebetween.

The right half of the cylinder block 12 (right and left described here indicate right and left of the vehicle body when the engine is mounted with the cylinder block 12 vertically disposed) is provided with first and third cylinders sequentially from a vehicle front side and the left half thereof is provided with second and fourth cylinders.

A crankcase that accommodates the crankshaft 11 is provided in a joined section between the right and left halves of the cylinder block 12.

The crankshaft 11 is rotatably supported by a main bearing that is provided in the cylinder block 12.

The cylinder block 12 is provided with a crank angle sensor (not illustrated) that detects an angle position of the crankshaft 11.

The cylinder head 13 is provided at each of the right and left ends of the cylinder block 12.

The cylinder head 13 includes a combustion chamber, an intake port, an exhaust port, an intake valve, an exhaust valve, and the like.

The combustion chamber is a recessed section provided so as to face a crown surface of the piston (not illustrated), and configures a part of a space in which air-fuel mixture compressed by the piston is combusted.

The intake port is a passage through which combustion air (fresh air) is introduced into the combustion chamber.

The exhaust port is a passage through which burnt gas (exhaust gas) is discharged from the combustion chamber.

The intake valve and the exhaust valve open and close the intake port and the exhaust port, respectively, at predetermined valve timing.

Each of the intake valve drive system 14 and the exhaust valve drive system 15 includes a cam sprocket that is driven by a crankshaft sprocket provided, for instance, at an end of the crankshaft 11 via a timing chain (not illustrated), a camshaft that is driven by the cam sprocket, and the like.

In addition, each of the intake valve drive system 14 and the exhaust valve drive system 15 includes a valve timing variable mechanism that causes relative rotation of the cam sprocket and the camshaft about a rotation center shaft by using a hydraulic actuator.

The ignition plug 16 produces an electric spark in the combustion chamber in accordance with an ignition signal from the engine control unit 100 to ignite the air-fuel mixture.

The intake system 20 sucks outside air and introduces the outside air as combustion air (fresh air) into the intake port of the cylinder head 13.

The intake system 20 includes an intake duct 21, an air cleaner 22, an airflow meter 23, an air-bypass valve 24, an intercooler 25, a throttle valve 26, an intake manifold 27, a tumble control valve 28, and the like.

The intake duct 21 is a pipe line through which the combustion air sucked from the outside is delivered.

As described later, a compressor 41 of the turbocharger 40 is provided in an intermediate portion of the intake duct 21.

The air cleaner 22 is provided near an inlet of the intake duct 21 and includes an air cleaner element that filters foreign matters such as dust, an air cleaner case that accommodates the air cleaner element, and the like.

The airflow meter 23 is a sensor that is provided in an outlet portion of the air cleaner 22 and measures the flow rate of air flowing therethrough.

The output of the airflow meter 23 is transmitted to the engine control unit 100 and is used for control of a fuel injection amount and the like.

The air-bypass valve 24 opens and closes a bypass passage that causes part of the air flowing through the intake duct 21 to bypass the section from an upstream side to a downstream side of the compressor 41.

The opening degree (amount of bypassing air) of the air-bypass valve 24 can be changed in accordance with a command from the engine control unit 100.

The intercooler 25 cools the air that has been compressed by the compressor 41 through heat exchange with, for instance, travel wind (an airflow generated on the vehicle body by a travel of the vehicle).

The throttle valve 26 adjusts the intake air amount for output adjustment of the engine 1.

The throttle valve 26 is opened and closed by an electric actuator in accordance with a command from the engine control unit 100 so as to have a specified opening degree.

The throttle valve 26 is disposed adjacently to an outlet of the intercooler 25.

A pressure sensor 26a that detects pressure of an intake pipe is provided on an inlet side (an upstream side) of the throttle valve 26.

The output of the pressure sensor 26a is transmitted to the engine control unit 100.

The intake manifold 27 is a branched pipe that distributes the air discharged from the throttle valve 26 to the intake ports of the cylinders.

The intake manifold 27 is provided with a pressure sensor 27a that detects the pressure of the intake pipe on a downstream side of the throttle valve 26.

The output of the pressure sensor 27a is transmitted to the engine control unit 100.

The tumble control valve 28 is provided in a passage of the intake manifold 27, switches a state of an air passage from the intake manifold 27 to the intake port, and thereby controls a state of a tumble flow that is generated in the cylinder.

The tumble control valve 28 is switched in accordance with a command from the engine control unit 100.

The exhaust system 30 discharges the burnt gas (the exhaust gas) from the exhaust port of the cylinder head 13.

The exhaust system 30 includes an exhaust manifold 31, an exhaust pipe 32, a front catalyst 33, a rear catalyst 34, a silencer 35, and the like.

The exhaust manifold 31 is an exhaust gas passage (pipe line) that collects the exhaust gas discharged from the exhaust ports of the cylinders and introduces the exhaust gas into a turbine 42 of the turbocharger 40.

The exhaust pipe 32 is an exhaust gas passage (pipe line) through which the exhaust gas from the turbine 42 of the turbocharger 40 is discharged to the outside.

The front catalyst 33 and the rear catalyst 34 are provided sequentially from the turbine 42 in an intermediate part of the exhaust manifold 31.

Each of the front catalyst 33 and the rear catalyst 34 is a three-way catalyst in which a carrier such as alumina carries a precious metal such as platinum, rhodium, or palladium to perform reduction processing of HC, CO, and NOx.

A front A/F sensor 33a and a rear A/F sensor 33b are provided at an inlet portion and an outlet portion of the front catalyst 33, respectively, to detect the air-fuel ratio (A/F) on the basis of the property of the exhaust gas.

The output of the front A/F sensor 33a and the output of the rear A/F sensor 33b are transmitted to the engine control unit 100 and are used for air-fuel ratio feedback control of the fuel injection amount, deterioration diagnosis of the front catalyst 33, and the like.

The silencer 35 is disposed adjacently to an outlet portion of the exhaust pipe 32, reduces sound energy of the exhaust gas, and thereby suppresses exhaust noise.

The exhaust pipe 32 is branched into, for instance, two pipes near the outlet portion and the silencers 35 are provided on the downstream side of the branched position.

The turbocharger 40 is an exhaust gas turbine supercharger that compresses combustion air by using the energy of the exhaust gas.

The turbocharger 40 includes the compressor 41, the turbine 42, a bearing housing 43, a waste gate valve 44, and the like.

The compressor 41 is a centrifugal compressor that compresses the combustion air.

The turbine 42 drives the compressor 41 by using the energy of the exhaust gas.

The bearing housing 43 is provided between the compressor 41 and the turbine 42.

The bearing housing 43 couples the housings of the compressor 41 and the turbine 42 and includes a bearing that rotatably supports a shaft coupling a compressor wheel and a turbine wheel, a lubricating device, and the like.

The waste gate valve (WGV) 44 opens and closes a waste gate passage that causes part of the exhaust gas to bypass the section from an inlet side to an outlet side of the turbine 42.

The waste gate valve 44 is an electronically controlled waste gate valve including an electric actuator 44a for opening and closing and an opening degree sensor (not illustrated) that detects an opening degree position, and the opening degree thereof is controlled by the engine control unit 100.

The fuel supply device 50 supplies fuel to each of the cylinders of the engine 1.

The fuel supply device 50 includes a fuel tank 51, a feed pump 52, a feed line 53, a high-pressure pump 54, a high-pressure fuel line 55, an injector 56, and the like.

The fuel tank 51 is a container that stores gasoline as the fuel.

The feed pump 52 discharges the fuel in the fuel tank 51 and delivers the fuel to the high-pressure pump 54.

The feed line 53 is a fuel passage through which the fuel discharged by the feed pump 52 is delivered to the high-pressure pump 54.

The high-pressure pump 54 is attached to the cylinder head 13, is driven via the camshaft, and thereby boosts fuel pressure.

The high-pressure pump 54 includes a plunger that reciprocates in the cylinder in conjunction with rotation of the camshaft to pressurize the fuel and an electromagnetic metering valve, and can adjust the fuel pressure in the high-pressure fuel line 55 by controlling the duty ratio of the electromagnetic metering valve by the engine control unit 100.

The high-pressure fuel line 55 is a fuel passage through which the fuel boosted by the high-pressure pump 54 is delivered to the injector 56 provided in each of the cylinders.

The injector 56 is an injection valve that enables cylinder injection (direct injection) of the fuel supplied from the high-pressure fuel line 55 into the combustion chamber of each of the cylinders in accordance with an injection signal from the engine control unit 100.

The engine control unit (ECU) 100 comprehensively controls the engine 1 and the auxiliary devices thereof.

The engine control unit 100 includes, for instance, an information processing unit such as a CPU, storage units such as a RAM and a ROM, an input/output interface, a bus interconnecting these components, and the like.

The engine control unit 100 receives the output of each of the sensors provided in the engine 1 and can output control signals to control targets that include the actuators, the valves, the ignition plug, the injector, and the like provided in the engine 1.

The engine control unit 100 sets a driver requested torque on the basis of an operation amount (a depression amount) of an accelerator pedal (not illustrated) during manual driving or an acceleration request or the like from an self-driving control system (not illustrated) during self-driving, controls the opening degree of the throttle valve 26, the valve timing, the supercharging pressure (opening degree of the waste gate valve 44), the state of the tumble control valve 28, the ignition timing, the fuel injection amount, the fuel injection timing, and the like such that the torque (actual torque) actually generated by the engine 1 approximates the driver requested torque, and thereby adjusts the output (torque) of the engine 1.

In one example, the engine control unit 100 may serve as a "requested torque setting unit".

The engine control unit 100 can communicate with a transmission control unit (TCU) 200 via an in-vehicle LAN such as a CAN communication system.

The output of the engine 1 is transmitted to drive wheels via a transmission (not illustrated).

The transmission includes a transmission mechanism (variator) such as, for instance, a chain CVT, a forward-reverse travel switching mechanism, an AWD transfer, a front differential, and the like accommodated in a common transmission case.

A torque converter that is a fluid coupling is provided between the crankshaft 11 and the transmission mechanism, as a start device that enables a start from the stop state.

The torque converter includes an impeller coupled to the crankshaft, a turbine coupled to the input shaft of the variator, a stator, and the like.

The torque converter has the lock-up clutch that restrains the differential rotation between the impeller and the turbine.

The release and engagement operation and the fastening force of the lock-up clutch are controlled by the transmission control unit 200.

The transmission control unit 200 comprehensively controls the transmission gear ratio of the transmission mechanism, the state of the forward-reverse travel switching mechanism, the state of the lock-up clutch, and the like on the basis of the travel state of the vehicle.

The transmission control unit 200 includes an information processing unit such as a CPU, storage units such as a RAM and a ROM, an input/output interface, a bus interconnecting these components, and the like.

The transmission control unit 200 has the function of generating a torque limiting request for limiting the output torque to a predetermined limited torque or less to protect the transmission by preventing the input of an excessive torque and transmitting the torque limiting request to the engine control unit 100.

The transmission control unit 200 generates a torque limiting request when the lock-up clutch is, for instance, in an open (unengaged) state and sets the limited torque that is the upper limit value of the input torque at that time.

In one example, the transmission control unit 200 may serve as a "limited torque setting unit".

Figure 2:
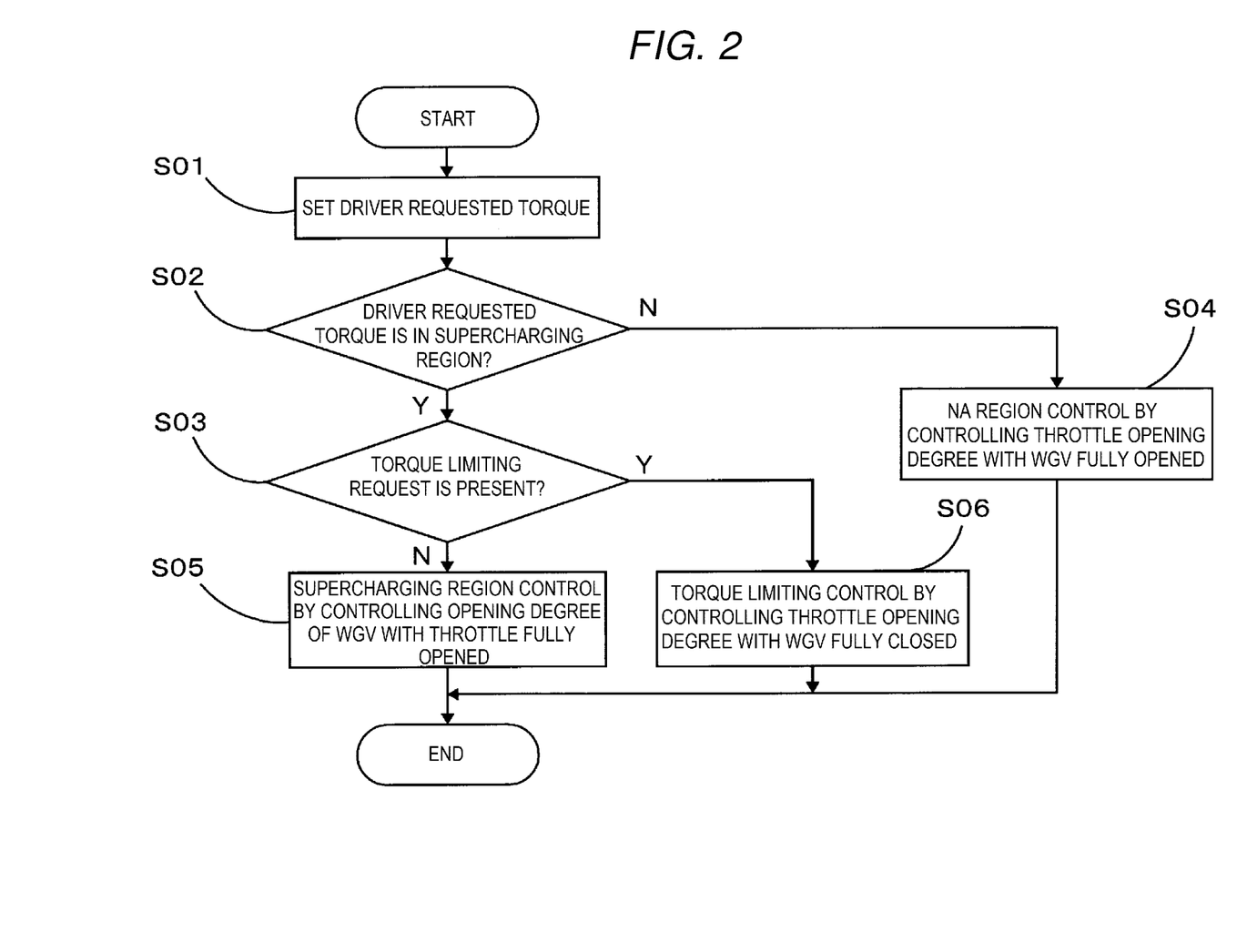
FIG. 2 is a flowchart illustrating output control in the engine control device according to the example.

FIG. 2 is a flowchart illustrating output control in the engine control device according to the example.

The steps of the operation will be described in sequence below.

<Step S01: Set the Driver Requested Torque>

The engine control unit 100 sets the driver requested torque on the basis of, for instance, the operation amount of the accelerator pedal, the acceleration request from self-driving control system, and the like.

Then, the processing proceeds to step S02.

<Step S02: Decide the Region of the Driver Requested Torque>

When the driver requested torque set in step S01 is a high load that cannot be generated unless supercharging is performed, the engine control unit 100 determines that the torque corresponds to the supercharging region (high load region) and the processing proceeds to step S03.

In contrast, when the driver requested torque set in step S01 is a low load that can be generated in the natural aspiration (NA) region in which supercharging is not substantially performed, the engine control unit 100 determines that the torque corresponds to the NA region (low load region) and the processing proceeds to step S04.

<Step S03: Determine Presence or Absence of a Torque Limiting Request>

The engine control unit 100 decides whether a torque limiting request has been input from the transmission control unit 200.

When a torque limiting request has been input, the engine control unit 100 obtains information about the limited torque that is the upper limit torque that can be generated by the engine 1, from transmission control unit 200.

When the torque limiting request has been input, the processing proceeds to step S06. Otherwise, the processing proceeds to step S05.

<Step S04: NA Region Control>

The engine control unit 100 performs NA region control (first control) in which the waste gate valve 44 is fully opened and the output adjustment of the engine 1 is performed by controlling the opening degree of the throttle valve 26.

In NA region control, the target opening degree of the throttle valve 26 is set uniquely with respect to, for instance, the driver requested torque.

Then, a series of processes is completed (returned).

<Step S05: Supercharging Region Control>

The engine control unit 100 performs supercharging region control (second control) in which the throttle valve 26 is fully opened and the output adjustment of the engine 1 is performed by controlling the opening degree of the waste gate valve 44.

The engine control unit 100 has the function of setting a target supercharging pressure in accordance with the driver requested torque in the supercharging region.

The engine control unit 100 performs supercharging pressure feedback control in which the opening degree of the waste gate valve 44 is controlled so that the actual supercharging pressure approaches the target supercharging pressure.

Then, a series of processes is completed (returned).

<Step S06: Torque Limiting Control>

The engine control unit 100 performs torque limiting control (third control) in which the waste gate valve 44 is fully closed and the output adjustment of the engine 1 is performed by controlling the opening degree of the throttle valve 26.

In torque limiting control, the opening degree of the throttle valve 26 is controlled so that the actual torque of the engine 1 substantially coincides with the limited torque.

Holding the waste gate valve 44 in the fully closed state pre-rotates the turbine and raises the supercharging pressure to a value equal to or more than the supercharging pressure required to generate the limited torque as the actual torque.

Accordingly, torque limiting control prevents the actual torque from exceeding the limited torque by reducing (nearly closing) the opening degree of the throttle valve 26.

In torque limiting control, the target opening degree of the throttle valve 26 is set on the basis of the ratio of the limited torque to the driver requested torque.

For instance, the target opening degree of the throttle valve 26 can be calculated by multiplying the ratio of the limited torque to the driver requested torque by a predetermined coefficient or the target opening degree can be read from a map prepared in advance on the basis of the ratio of the limited torque to the driver requested torque.

At this time, the target opening degree of the throttle valve 26 is corrected on the basis of the intake air temperature, the atmospheric pressure, and the engine speed.

Since the air density reduces when the intake air temperature rises, the target opening degree is corrected to a larger value.

In contrast, since the air density increases when the intake air temperature reduces, the target opening degree is corrected to a smaller value.

Since the air density reduces when the atmospheric pressure reduces, the target opening degree is corrected to a larger value.

In contrast, since the air density increases when the atmospheric pressure increases, the target opening degree is corrected to a smaller value.

In addition, since the flow rate of the intake air changes depending on the engine speed, the target opening degree is corrected using a correction coefficient calculated on the basis of the atmospheric pressure and the engine speed.

Then, a series of processes is completed (returned).

An effect of the present example will be described below in contrast with the engine control devices according to the comparative example of the present invention described below.

In the comparative example, the parts substantially common to those in the example are denoted by the same reference numerals to omit duplicate description and the differences will be mainly described.

The engine control device in the comparative example makes the same control (supercharging pressure feedback control) as the supercharging region control in the example regardless of the presence or absence of a torque limiting request when the driver requested torque corresponds to the supercharging region.

Figure 3:
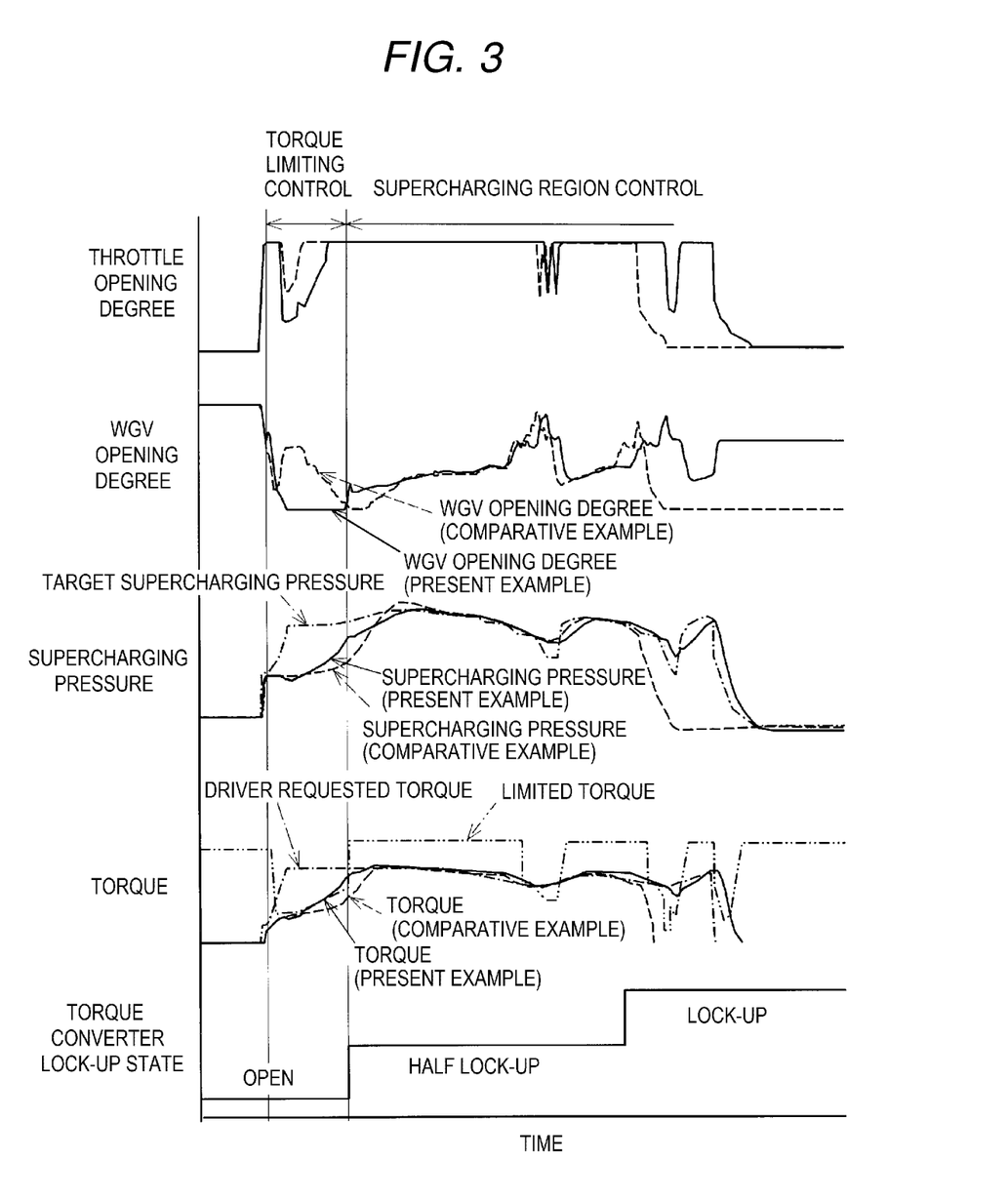
FIG. 3 is a graph illustrating an instance of the progression of the throttle opening degree, the waste gate valve opening degree, the supercharging pressure, the torque, and the like in engines having engine control devices according to the example and a comparative example.

FIG. 3 is the graph illustrating an instance of the progression of the throttle opening degree, the waste gate valve opening degree, the supercharging pressure, the torque, and the like in engines having engine control devices according to the example and the comparative example.

In FIG. 3, the horizontal axis represents the time and the vertical axis represents the throttle opening degree, the waste gate valve opening degree, the supercharging pressure, the torque, and the lock-up state of the torque converter.

In FIG. 3, the data of the example is indicated by solid lines and the data of the comparative example is indicated by dashed (dotted) lines.

For the supercharging pressure, the target supercharging pressure is indicated by a dot-dash line.

For the torques, the driver requested torque is indicated by a dot-dash line and the limited torque is indicated by a dot-dot-dash line.

FIG. 3 represents a state in which a vehicle starts with an accelerator opening degree of 100% (state in which the accelerator pedal is fully depressed) from the stop state.

For a predetermined period (for instance, 1 to 2 seconds or so) immediately after the start, since the torque converter absorbs the differential rotation between the input side and the output side as a start device, the lock-up clutch is put in the opened (unengaged) state.

Although the lock-up clutch shifts to the lock-up state via the half lock-up state, since concern about the durability, reliability, and the like of the transmission mechanism and the like rises when a large torque is input in the open state, the torque limitation is imposed until the open state ends.

In the example, torque limiting control starts in the engine control unit 100 in accordance with a torque limiting request from the transmission control unit 200 and the waste gate valve 44 is kept in the fully closed state. With this, substantially all of the exhaust gas from the engine 1 is introduced into the turbine 42 and the turbine 42 is rotationally driven and pre-rotated.

In contrast, in the comparative example, supercharging pressure feedback control is made, the waste gate valve 44 is opened when the torque converter is in the open state, and the considerable amount of exhaust gas bypasses the turbine 42 without driving the turbine 42.

Accordingly, the supercharging pressure in the example rises more quickly than in the comparative example and, in the latter half of the period in which torque limiting control is made, the supercharging pressure in the example is apparently higher than in the comparative example.

At this time, output adjustment is performed in the example to prevent the actual torque from exceeding the limited torque by making the throttle opening degree smaller than in the comparative example.

After that, when the lock-up clutch is put in the half lock-up state as the vehicle speed increases, the torque limiting request is released and the torque limitation is released.

Although the supercharging region control (supercharging pressure feedback control) in the example shifts to the same supercharging region control as in the comparative example due to the release of the torque limitation, since the supercharging pressure in the example at the point of the shift is larger than in the comparative example, it is clear that a larger torque close to the driver requested torque can be generated in the example than in the comparative example in the early stage of the shift.

As a result, the acceleration time can be reduced by, for instance, 0.07 seconds at 0 to 20 MPH in the example as compared with the comparative example.

According to the example described above, the following effects can be obtained.

(1) By performing output adjustment by controlling the intake air amount using the throttle valve 26 without opening the waste gate valve 44 when a torque limiting request is generated, it is possible to sufficiently pre-rotate the turbine 42 of the turbocharger 40 to raise the supercharging pressure, suppress a supercharging response delay after release of the torque limitation, and perform appropriate torque limitation by the opening degree control of the throttle valve 26.

(2) By setting the target opening degree of the throttle valve 26 in torque limiting control on the basis of the ratio of the limited torque to the driver requested torque, it is possible to set the opening degree of the throttle valve 26 appropriately, prevent the limited torque from being exceeded, and ensure drivability (ease of driving) even when the supercharging pressure is high by fully closing the waste gate valve 44.

(3) By adopting the structure in which a torque limiting request is generated when the lock-up clutch is opened, it is possible to protect the transmission and the like by preventing an excessive torque from being inputting to the transmission mechanism and the like and improve the acceleration performance of the vehicle by quickly raising the supercharging pressure after the lock-up clutch is engaged.

As described above, according to the example, it is possible to provide an engine control device that suppresses a supercharging response delay when acceleration is made from the state in which torque limitation is imposed.

Modified Example

The present invention is not limited to the example described above, various modifications and changes can be made, and these modifications and changes also fall within the technical scope of the present invention.

(1) The structures of the engine and the engine control device are not limited to those described in the above example and can be changed as appropriate.

For instance, the cylinder layout, the number of the cylinders, the fuel injection method, and the like of the engine can be changed as appropriate.

Although a butterfly valve is used as the throttle valve of the engine in the example, the throttle valve may be a slide valve or other type of throttle valve or may be a so-called valve throttle whose intake air amount is adjusted by the valve timing and lift of an intake valve.

(2) Although, for instance, a chain CVT is used as the transmission in the example, the transmission is not limited to a chain CVT and may be other type of transmission such as, for instance, a belt CVT, a toroidal CVT, or a step AT having a planetary gear set.

(3) Although the throttle is fully opened in supercharging region control in the example, substantially the same effect can be obtained if the throttle has a sufficiently high opening degree even when the throttle is not fully opened.

In addition, although the waste gate valve is fully opened in NA region control in the example, substantially the same effect can be obtained if the waste gate valve has a sufficiently high opening degree even when the waste gate valve is not fully opened.

The invention claimed is:

1. An engine control device configured to control an engine, the engine control device comprising:
    a processor; and
    a memory coupled to the processor and storing instructions,
    wherein the engine comprises:
        a turbocharger comprising a turbine configured to be driven by an exhaust gas and a compressor configured to be driven by the turbine;
        a waste gate valve that is provided in a passage that allows the exhaust gas to bypass a section from an inlet side to an outlet side of the turbine; and
        a throttle configured to adjust an intake air amount, and
    wherein the processor executes the instructions, such that:
        in a predetermined low load region, the engine control device is configured to perform a first control in which the waste gate valve is opened at a predetermined opening degree or more and output adjustment is performed by an opening degree of the throttle;
        in a predetermined high load region, the engine control device is configured to perform a second control in which the throttle is opened at a predetermined opening degree or more and output adjustment is performed by an opening degree of the waste gate valve; and
        when a torque limiting request is generated in the high load region, the engine control device is configured to perform a third control in which the waste gate valve is substantially fully closed and output adjustment is performed by the opening degree of the throttle based on a ratio of a limited torque, which is set when the torque limiting request is generated, to a requested torque, which is set on a basis of a driving state of a vehicle.

2. The engine control device according to claim 1, further comprising:
    a requested torque setting unit configured to set the requested torque on the basis of the driving state of the vehicle; and
    a limited torque setting unit configured to set the limited torque when the torque limiting request is generated.

3. The engine control device according to claim 1, wherein the torque limiting request is generated when a lock-up clutch of a torque converter provided between the engine and a transmission mechanism is unengaged.

4. The engine control device according to claim 2, wherein the torque limiting request is generated when a lock-up clutch of a torque converter provided between the engine and a transmission mechanism is unengaged.

5. The engine control device according to claim 1, further comprising a, circuitry configured to:
    set the requested torque on a basis of the driving state of the vehicle; and
    set the limited torque when the torque limiting request is generated.

6. The engine control device according to claim 1, wherein the third control adjusts the opening degree of the throttle based on multiplying the ratio of the limited torque to the requested torque by a predetermined coefficient.

7. The engine control device according to claim 6, wherein the third control further adjusts the opening degree of the throttle on a basis of an intake air temperature, an atmospheric pressure, and an engine speed.

8. The engine control device according to claim 1, wherein the third control adjusts the opening degree of the throttle based on information in a map prepared in advance on a basis of the ratio of the limited torque to the requested torque.

9. The engine control device according to claim 8, wherein the third control further adjusts the opening degree of the throttle on a basis of an intake air temperature, an atmospheric pressure, and an engine speed.

10. The engine control device according to claim 1, wherein the engine control device sets the requested torque on a basis of an operation amount of an accelerator pedal of the vehicle.

11. The engine control device according to claim 1, wherein the engine control device sets the requested torque on a basis of an acceleration request from a self-driving control system.

12. An engine of a vehicle, the engine comprising:
    a turbocharger comprising a turbine configured to be driven by an exhaust gas and a compressor configured to be driven by the turbine;
    a waste gate valve that is provided in a passage that allows the exhaust gas to bypass the turbine;
    a throttle configured to adjust an intake air amount; and
    an engine control device comprising a processor executing instructions such that:
        in a predetermined low load region, the engine control device is configured to perform a first control in which the waste gate valve is opened at a predetermined opening degree or more and output adjustment is performed by an opening degree of the throttle;
        in a predetermined high load region, the engine control device is configured to perform a second control in which the throttle is opened at a predetermined opening degree or more and output adjustment is performed by an opening degree of the waste gate valve; and
        when a torque limiting request is generated in the high load region, the engine control device is configured to perform a third control in which the waste gate valve is substantially fully closed and output adjustment is performed by the opening degree of the throttle based on a ratio of a limited torque, which is set when the torque limiting request is generated, to a requested torque, which is set on a basis of a driving state of the vehicle.

13. The engine according to claim 12, wherein the engine control device further comprises a circuitry configured to:
    set the requested torque on a basis of the driving state of the vehicle; and set the limited torque when the torque limiting request is generated.

14. The engine according to claim 12, wherein the torque limiting request is generated when a lock-up clutch of a torque converter provided between the engine and a transmission mechanism is unengaged.

15. The engine according to claim 12, wherein the third control adjusts the opening degree of the throttle based on multiplying the ratio of the limited torque to the requested torque by a predetermined coefficient.

16. The engine according to claim 15, wherein the third control further adjusts the opening degree of the throttle on a basis of an intake air temperature, an atmospheric pressure, and an engine speed.

17. The engine according to claim 12, wherein the third control adjusts the opening degree of the throttle based on information in a map prepared in advance on a basis of the ratio of the limited torque to the requested torque.

18. The engine according to claim 17, wherein the third control further adjusts the opening degree of the throttle on a basis of an intake air temperature, an atmospheric pressure, and an engine speed.

19. The engine according to claim 12, wherein the engine control device sets the requested torque on a basis of an operation amount of an accelerator pedal of the vehicle.

20. The engine according to claim 12, wherein the engine control device sets the requested torque on a basis of an acceleration request from a self-driving control system.

\* \* \* \* \*